April 19, 1960  J. F. HEALY  2,933,007
FLAT EXPANDING INSERT HAVING AN ARCHED CONNECTING MEMBER
Filed March 27, 1956  2 Sheets-Sheet 1
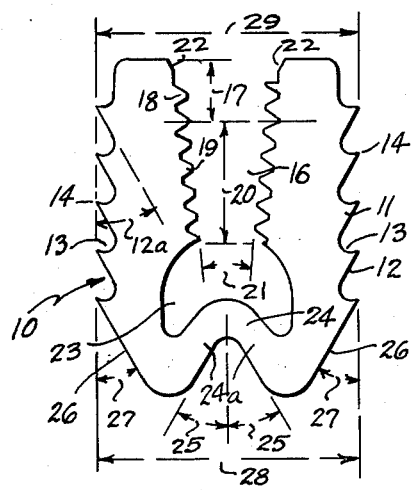
Fig. 1.
Fig. 2.
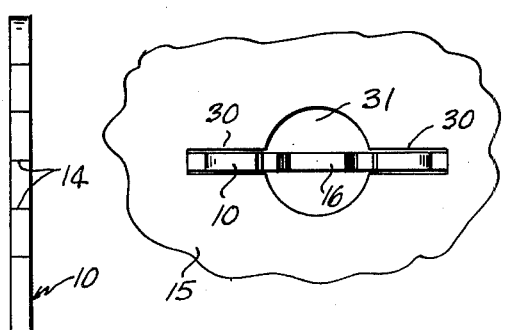
Fig. 3.
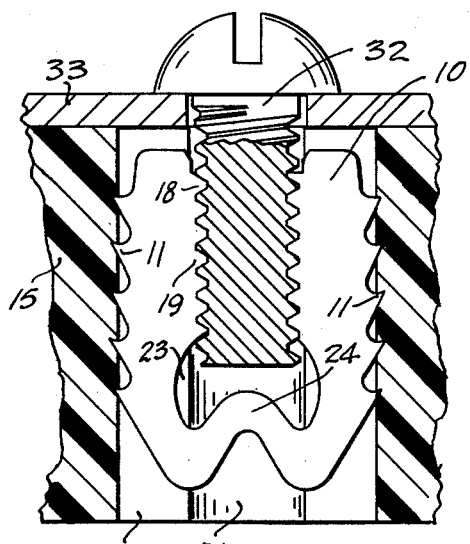
Fig. 4.
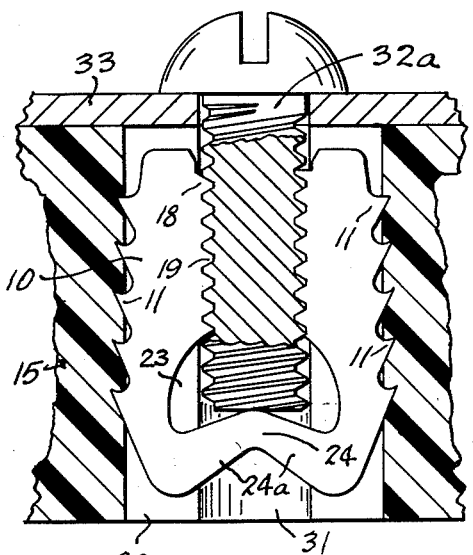
Fig. 6.
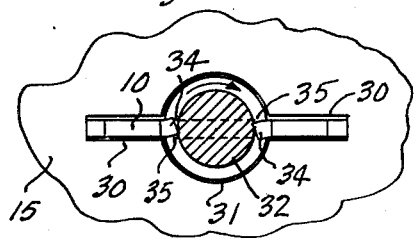
Fig. 5.
INVENTOR
Joseph F. Healy
BY
Wooster & Davis
ATTORNEYS.

April 19, 1960  J. F. HEALY  2,933,007
FLAT EXPANDING INSERT HAVING AN ARCHED CONNECTING MEMBER
Filed March 27, 1956  2 Sheets-Sheet 2
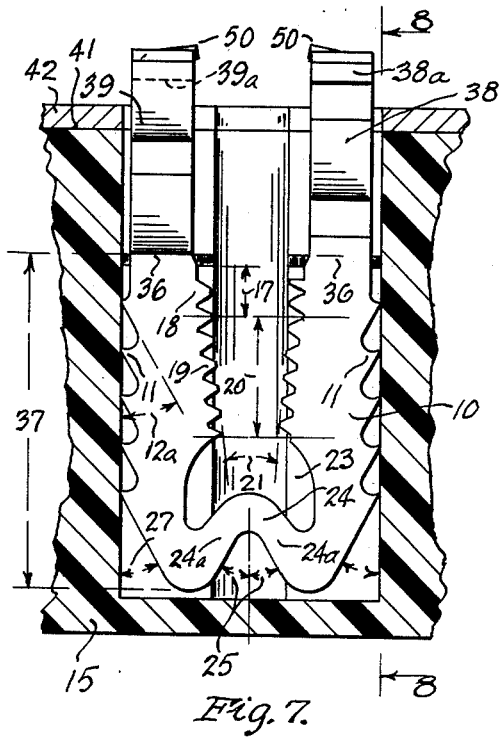
Fig. 7.
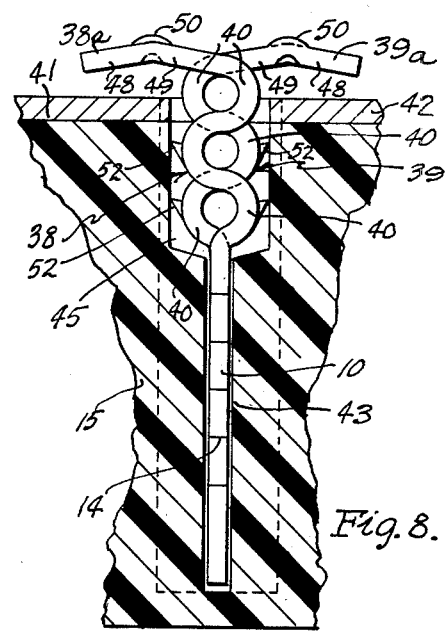
Fig. 8.
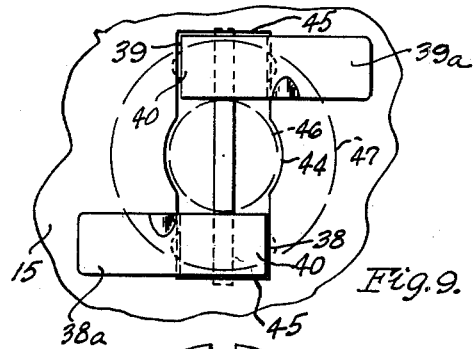
Fig. 9.
Fig. 11.
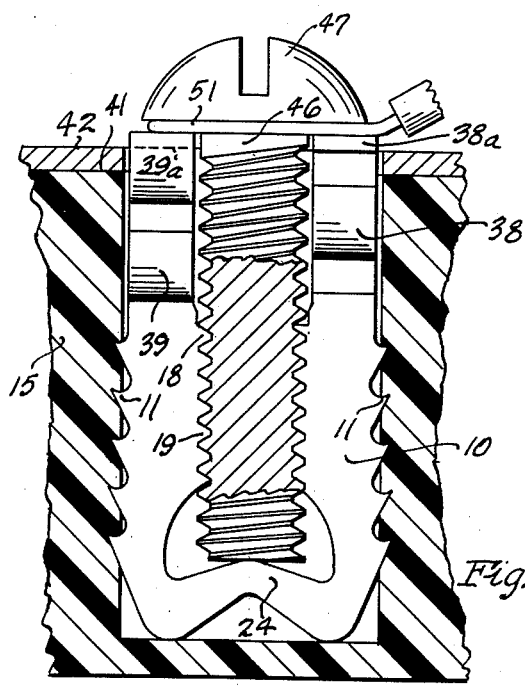
Fig. 10.
INVENTOR
Joseph F. Healy
BY
Wooster & Davis
ATTORNEYS.

United States Patent Office 2,933,007
Patented Apr. 19, 1960

2,933,007

FLAT EXPANDING INSERT HAVING AN ARCHED CONNECTING MEMBER

Joseph F. Healy, Westport, Conn., assignor to Boots Aircraft Nut Corporation, Norwalk, Conn., a corporation of Delaware Application March 27, 1956, Serial No. 574,265

5 Claims. (Cl. 85—2.4)

This invention relates to a pressed metal insert fastener for use in phenolic bases and similar materials, and has for an object to provide a fastener of this type which may be pressed from flat metal of suitable gauge and thickness and which will have means for gripping the sides of the opening in the phenolic or similar material in which it is inserted, to anchor it therein, and which insert is adapted to receive a securing screw and is so constructed and arranged that insertion of the screw into the fastener will spread it to imbed the gripping means in the base material to more securely lock and anchor the fastener therein.

Another object is to provide a fastener of this type which may be provided with additional means for retaining a plate or other part in place on the base after removal of the screws, for permitting attachment of a wire or other object.

A further object of the invention is to form an insert fastener which will have improved means automatically coming into effect by insertion of the screw to increase the friction and grip on the threads of the screw toward the end of the operation of applying the screw, to increase the friction and grip on the threads of the screw to increase holding power and resist loosening of the screw under vibration and similar actions.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a side view of the insert fastener on an enlarged scale;

Fig. 2 is an edge view thereof;

Fig. 3 is a plan view of the insert inserted in an opening in a phenolic base or a base made of similar material, before applying the screw;

Fig. 4 is a vertical section showing one effect of inserting a screw in the insert;

Fig. 5 is a view similar to Fig. 3 showing a screw inserted in the insert, the screw being shown in section;

Fig. 6 is a section similar to Fig. 4 showing the effect which may be secured by using a longer screw;

Fig. 7 is a section similar to Figs. 4 and 6 showing a modified form of the insert in the opening or recess in the base member before applying the screw;

Fig. 8 is a similar section taken at right angles to Fig. 7, substantially on line 8—8 of Fig. 7;

Fig. 9 is a top plan view of Fig. 8.

Fig. 10 is a section similar to Fig. 7 showing the screw applied, and

Fig. 11 is a section similar to Fig. 8 showing the effect on the upper part of the insert secured by application of the screw.

Referring first to the form of the device shown in Figs. 1 to 6, it comprises an insert member 10 pressed or stamped from flat metal, such, for example, as steel or other similar material, of suitable gauge or thickness, such, for example, as from about .025 inch to about .031 inch, although it is to be understood the thickness may be varied as found desirable or required for the use intended. It is provided with a series of teeth 11 on each side inclined downwardly and inwardly on their under sides, as indicated at 12, preferably at an angle 12a of about 30° to the vertical, but substantially straight or horizontal or slightly concavely curved on their upper sides 13 to form a sharp outer edge 14 to grip the material of the base 15 in which it is inserted. Extending downwardly from the top of the insert is a recess 16, and this is threaded to receive a securing screw. It is substantially straight for a distance down from the top, indicated at 17, with a thread 18, which is straight or of uniform diameter for about one and one-half threads, and then the threads are continued at 19 for about five threads, or about the distance 20, and these threads are of gradually decreasing diameter or tapered downwardly and inwardly at an angle of about ten degrees, at indicated at 21. The threads preferably have flat peaks and valleys for best tool endurance, and the top thread 18 may be spaced a short distance below the top edge of the insert as indicated, and the edge tapered or bevelled somewhat as indicated at 22 to facilitate insertion of a fastening screw.

The insert is further recessed below the threads, as indicated at 23, and wider than the lower threads, and shaped to provide an upwardly curved and tapered hump or cantilever 24 having inclined sides 24a running into the lower end portion of the insert, and spaced below the lower end of the threaded recess 16. The inner ends of the side portions are there connected by this cantilever. The angle of the lower edge of these sides may vary, depending on the effect desired. That shown in Fig. 1 is about thirty degrees to the vertical, as indicated at 25. The outer edges 26 of the lower end portion of the insert are also preferably inclined to the vertical at about the same angle, thirty degrees, as indicated at 27. Also the total width of the insert, or that is, the outer toothed portion of it, may progress slightly from its upper to its lower end so that it is slightly wider as indicated at 28, than at its upper end as indicated at 29, for slight gripping of the base material as the insert is applied to it.

The insert is applied to the base member 15, such, for example, as "Bakelite" or similar plastic material, by means of an opening or recess comprising a slot 30 slightly wider than the thickness of the insert, and slightly shorter than the width of the insert so it is inserted with a light push, and with a central circular portion 31 of slightly larger diameter than that of the screw 32 to be used in the insert. The member 10 is inserted in this opening or recess and then the screw applied, as indicated in Figs. 4 and 6, and the screw may be used for fastening another member to the base member 15, such, for example, as a plate 33. As the screw is inserted in the insert it is readily started on the straight threads 18 and then as it passes downwardly into the tapered portion 20 of the recess and the threads 19 it spreads the opposite sides of the insert to cause the outer edges 14 of the teeth 11 to embed themselves into the material of the base 15 at the outer edges of the slot 30, as indicated in Fig. 4, to securely anchor them therein and thus effectively and securely anchor the insert in the base member. The reduced connecting portion between the inner ends of the side portions and the cantilever 24 bend or yield sufficiently to permit this, and the cantilever itself may yield somewhat. If this secures sufficient anchoring of the insert the shorter screw shown in Fig. 4 may be used, but if a further penetration of the teeth into the material of the base member and a greater gripping or anchoring effect is desired, a longer screw may be used, as shown at 32a in Fig. 6, and the screw may be run down farther so that its lower end will engage the hump or cantilever 24, which is bowed upwardly as indicated, with downwardly and outwardly inclined side walls 24a, and as the screw is forced down further it presses down on this cantilever, causing it to flatten out as shown in Fig. 6 and force the opposite outer edges of the insert with their gripping teeth still further into the end walls of the recess 30 for a further and greater gripping effect. The cantilever could be more nearly substantially V-shaped or more acute so it spreads with greater movement. If it is made flatter it has greater lateral pressure or force with smaller movement of the screw. This, as indicated, is additional to the taper on the threads which may be used for greater gripping effect and holding if desired.

Another effect is shown in Fig. 5. That is, because the insert is flat and not round, as the screw enters the tapered area of the insert friction increases until maximum expansion is attained and deformation of insert takes place. Further gripping or friction of the threads of the screw on the threads of the insert will force them laterally, as indicated at 34, further increasing the grip on the screw to prevent it from unscrewing under vibration and similar action. Also the inner edge of the thread may embed or dig itself somewhat into the side of the screw, as indicated at 35, for a greater hold or grip. Besides increasing the holding power or grip on the screw, this also compensates for variations in the members and prevents splitting of the insert.

The modified form of insert shown in Figs. 7 to 11 is provided with means for retaining a plate or other part on the base member after the screw is removed following initial assembly of the screw into the insert in the base member. This insert from the point 36 to its lower end, as indicated by the line 37, Fig. 7, is the same as the insert shown in Figs. 1 to 6, but above this point has been added two somewhat accordion shaped or oppositely curved depressible portions 38 and 39. These portions comprise substantially flat strips each forming an extension of the upper edge portion of the insert above the top edge 36 at each side of the tapered and threaded recess 16, 17. As shown in Fig. 8, they each comprise connected, reversely curved portions 40 somewhat accordion shaped, and starting from the top edges 36 the curved portion 40 of the strip 39 is bent in the opposite direction from that of the strip 38 on the same level, and this is carried through the length of these strips, so that at their upper ends the opposite ends of these strips, indicated at 38a and 39a, are bent and extend laterally in opposite directions from these reversely curved portions 40. The strips are so shaped and proportioned that when the insert is inserted in the opening or recess in the base member 15 they are spaced above the top surface 41 of this member, as indicated in Fig. 8, leaving a space for the member to be secured or fastened to the base member, such, for example, as a plate 42. In forming the opening in the base member 15 the lower portion to receive the portion 37 of the insert is a flat elongated recess 43 with a circular central portion 44 of the same shape as shown in Fig. 3, but at the top of the side portions at the opposite side of the circular portion 44 it is widened, as shown at 45, to provide space to receive the collapsible reversely curved portions 40 of the strips 38 and 39, as shown in Fig. 8. Now, when the screw 46 is inserted in this insert, as it passes down the tapered threaded portion of the recess 16 it spreads the opposite sides of the insert laterally to embed the anchoring teeth 11 in the ends of the recess 43 the same as in the action in the first form, and as shown in Fig. 10. Also, the lower end of the screw engaging the hump or cantilever 24 has the same action in further spreading the insert. However, as the head 47 of the screw engages the laterally extending ears 38a and 39a, it flattens down or compresses, or that is, collapses, the reversely curved portions 40 of the strips 38 and 39, as shown in Fig. 11, and at the same time compresses the laterally extending ears 38a and 39a down on top of the member 42, as shown in this figure. Before being compressed the ears 38a and 39a are preferably somewhat humped in the middle so as to be inclined downwardly in opposite directions, as indicated at 48 and 49, and are bumped upwardly and deformed slightly at one edge to provide on the inner edge of each lug 38a and 39a an inwardly facing raised sharp edge 50 which, as shown in Figs. 8 and 9, are under the head of the screw and face in the same direction as turning movement of the screw in tightening it up, or in other words, in the opposite direction to movement of the head of the screw in the direction in which it is loosened. When the screw is tightened up, these two lugs 38a and 39a are flattened down against a certain amount of resilient action of the metal, as shown in Fig. 11, to increase the tight grip of the head of the screw on these lugs, and the sharp edges 50 cut slightly into and grip the under surface of the head of the screw to lock it against turning in the opposite direction and loosening under vibration or similar action. Collapsing of the reversely curved portions 40 to the position of Fig. 11 provides a certain collapsed set in these portions so that after removal of the screw the insert is still retained and locked in its position in the base member 15, and the ears 38a and 39a will retain the member 42 in its position on the base member 15. This will permit removal of the screw for securing an additional member to the plate 42 or to the insert, such, for example, as an electrical conductor wire 51 wrapped around the shank of the screw and leading to some electrical device. Also, if desired, the outside curved portions of the accordion sections 40 may be provided with additional gripping teeth or lugs 52 to be forced into the opposite sides of the recess 45 as these portions are collapsed to the position of Fig. 11 to secure an additional anchoring or holding effect on the material of the base member 15.

It will be seen from the above that this provides a simple and effective insert fastener which may be stamped or pressed from flat metal of the proper gauge or thickness, and thus may be formed with a simple operation and less cost than round fasteners; that no means is required for holding it against turning in the base member when the screw is being applied as it is seated in a flat, elongated recess; that it is effectively anchored in the base member by the simple act of inserting the screw into this insert, and further, that the fastener itself comprises only one integral member in addition to the screw.

Having thus set forth the nature of my invention, I claim:

1. An insert fastener comprising a substantially flat one piece insert including opposite side portions separated by an inwardly tapered recess extending longitudinally inwardly from one end terminating short of the inner end of the insert so that the inner ends of the side portions are connected by a transverse member in the same plane as the side portions, this member including oppositely and inwardly inclined portions extending toward the outer end of the insert and adapted to yield outwardly to permit spreading of the side portions, the outer edges of the side portions of the insert having a series of gripping teeth, and the edges of the tapered recess provided with screw threads adapted to receive a fastening screw and operable therewith because of the taper of the recess and pressure of the inner end of the screw on the connected inner ends of the inclined portions of the transverse member connecting the inner ends of the side portions to spread the opposite side portions and embed the teeth in the sides of an opening in which the insert is inserted and anchor the insert in the opening.

2. An insert fastener comprising a substantially flat one piece insert adapted to be inserted in a similarly shaped opening in a base member of phenolic or similar material, the opposite outer side edges of the insert provided with a series of teeth to grip the opposite ends of the opening in the base, said insert comprising opposite side portions separated by an inwardly tapered recess extending longitudinally from the outer end of the insert and provided with screw threads on its opposite side edges adapted for insertion of a fastening screw, and the inner ends of the side portions connected by a transversed arched member in the same plane as the side portions arranged with its convex side facing outwardly and adapted to be depressed by pressure of the end of the screw to spread the inner end portions of the side portions outwardly to cause the teeth to grip the base member and anchor the insert in the opening.

3. An insert fastener comprising a substantially flat one-piece insert adapted to be inserted in a similarly shaped opening in a base member of phenolic or similar material, the opposite outer side edges of the insert provided with a series of teeth to grip the opposite ends of the opening in the base, said insert comprising opposite side portions separated by a recess extending longitudinally from the outer end of the insert and provided with screw threads on the opposite edges of the recess to receive a fastening screw, said insert including means operated by the screw to spread the side portions to cause the teeth to grip the base member, integral substantially accordion shaped extensions on the outer ends of the flat side portions terminating in lateral ears to lie at an angle to the side portions at the outer side of the base member and secure another member to the base member, said extensions comprising adjacent connected oppositely curved portions collapsible by longitudinal pressure of the screw to clamp the ears against the secured member.

4. An insert fastener according to claim 3 in which the extensions at the outer ends of the side portions are substantially flat strips with ears at their outer ends extending in opposite directions from the insert and provided with an upwardly pressed sharp edged lug to grip the under side of the screw head to prevent its turning backwardly to loosen.

5. An insert fastener comprising a substantially flat one piece insert adapted to be inserted in a similarly shaped opening in a base member of phenolic or similar material, the opposite outer side edges of the insert provided with a series of teeth to grip the opposite ends of the opening in the base, said insert comprising opposite side portions separated by a recess extending longitudinally from the outer end of the insert and provided with screw threads on the opposite edges of the recess to receive a fastening screw, said insert including means operated by the screw to spread the side portions to cause the teeth to grip the base member, integral substantially accordion shaped extensions on the outer ends of the flat side portions terminating in lateral ears to lie at an angle to the side portions at the outer side of the base member and secure another member to the base member, said extensions being collapsible by longitudinal pressure of the screw to clamp the ears against the secured member, the extensions at the outer ends of the side portions comprising substantially flat strips formed with oppositely curved collapsible portions and the ears at their outer ends being offset outwardly intermediate their lengths to be collapsed against the secured member by pressure of the head of the screw.

References Cited in the file of this patent

UNITED STATES PATENTS

| | | |
|---|---|---|
| 703,652 | Griffiths | July 1, 1902 |
| 929,979 | Pleister | Aug. 3, 1909 |
| 1,066,040 | Osborne | July 1, 1913 |
| 1,114,971 | Diefendorf | Oct. 27, 1914 |
| 1,992,093 | Place | Feb. 19, 1935 |
| 2,037,122 | Despard | Apr. 14, 1936 |
| 2,049,585 | Gunthorp | Aug. 4, 1936 |
| 2,055,329 | Benander | Sept. 22, 1936 |
| 2,129,949 | Lombard | Sept. 13, 1938 |
| 2,267,771 | Von Holtz | Dec. 30, 1941 |
| 2,386,824 | Tinnerman | Oct. 16, 1945 |
| 2,465,654 | Millard | Mar. 29, 1949 |
| 2,482,567 | Trowbridge | Sept. 20, 1949 |
| 2,591,575 | McCollum | Apr. 1, 1952 |

FOREIGN PATENTS

| | | |
|---|---|---|
| 767,444 | France | May 1, 1934 |
| 444,623 | Great Britain | Mar. 23, 1936 |